United States Patent [19]

Del Rosso

[11] 4,440,249

[45] Apr. 3, 1984

[54] MOTORIZED WEIGHING CONVEYOR

[75] Inventor: Victor Del Rosso, Ithaca, N.Y.

[73] Assignee: Hi-Speed Checkweigher Co., Inc., Ithaca, N.Y.

[21] Appl. No.: 346,257

[22] Filed: Feb. 5, 1982

[51] Int. Cl.³ .................. G01G 19/00; H02K 3/50
[52] U.S. Cl. ............................. 177/145; 310/67 R
[58] Field of Search .................. 177/145; 310/67 R

[56] References Cited

U.S. PATENT DOCUMENTS

| 1,323,245 | 12/1919 | Berkes | 310/67 R |
| 2,997,608 | 8/1961 | Musser | 310/67 R |
| 3,056,054 | 9/1962 | Christian | 310/67 R X |
| 4,023,668 | 5/1977 | De Santo | 177/145 X |
| 4,074,157 | 2/1978 | Lace | 310/67 R |
| 4,336,470 | 6/1982 | Gutris | 310/67 R X |

Primary Examiner—George H. Miller, Jr.
Attorney, Agent, or Firm—Bean, Kauffman & Bean

[57] ABSTRACT

There is disclosed a commodity transport conveyor mounted on a weighing device; the conveyor being powered by a drive roller housing an electric motor. The stator of the motor is fixed to the conveyor frame and the rotor of the motor drives the roller and is in dynamic balance therewith.

2 Claims, 3 Drawing Figures

MOTORIZED WEIGHING CONVEYOR

BACKGROUND OF THE INVENTION

This invention relates to commodity transport/weighing machines such as are used in the food packaging/processing and similar industries; and more specifically to transport means for moving goods packaged in cases or bags or the like across weighing platforms such as at so-called "on the fly" speeds. Load cells or other weight-responsive transducers are typically connected to the weighing platform for determining and indicating and/or recording the weights of the transported items. Arrangements for such purposes are shown for example in my earlier U.S. Pat. Nos. 3,180,475 and 4,114,707. However, in such systems, it is imperative that the weighing platform be protected against vibratory/resonance impact forces incidental to the weighing operation such as would interfere with the accuracies of the container weight measurements.

OBJECTS AND BRIEF SUMMARY OF THE INVENTION

The present invention provides an improvement in the package transport/weighing industry; whereby intolerable previously encountered operational vagaries of such prior control systems are avoided. This invention provides an improved system whereby that part of the system which conveys the items to be weighed in succession across the weighing platform is isolated from heretofore disturbing externally generated influences, such as are inevitably induced in prior art systems by way of the gear/chain/belt drive mechanism or the like which operatively connects the remotely located power supply motor to the roller driving the over-the-platform conveyor.

The present invention is characterized in that the over-the-scale conveyor system is powered by an electric motor, the rotor of which is keyed to and arranged in dynamically balanced relation with the structure of the driving roller of the conveyor. Thus, vibratory inputs are avoided such as are typically imposed on conveyor systems employing remotely stationed solidly-based drive motors having interconnecting power transmission devices such as chain and sprocket; V-belt and sheave drive systems; and the like which require tensioning devices and safety guard devices. The requisite use of such arrangements inevitably produce in such prior art systems inaccurate weighing "scale-fluttering" effects.

DETAILED SPECIFICATION

Figure 1:
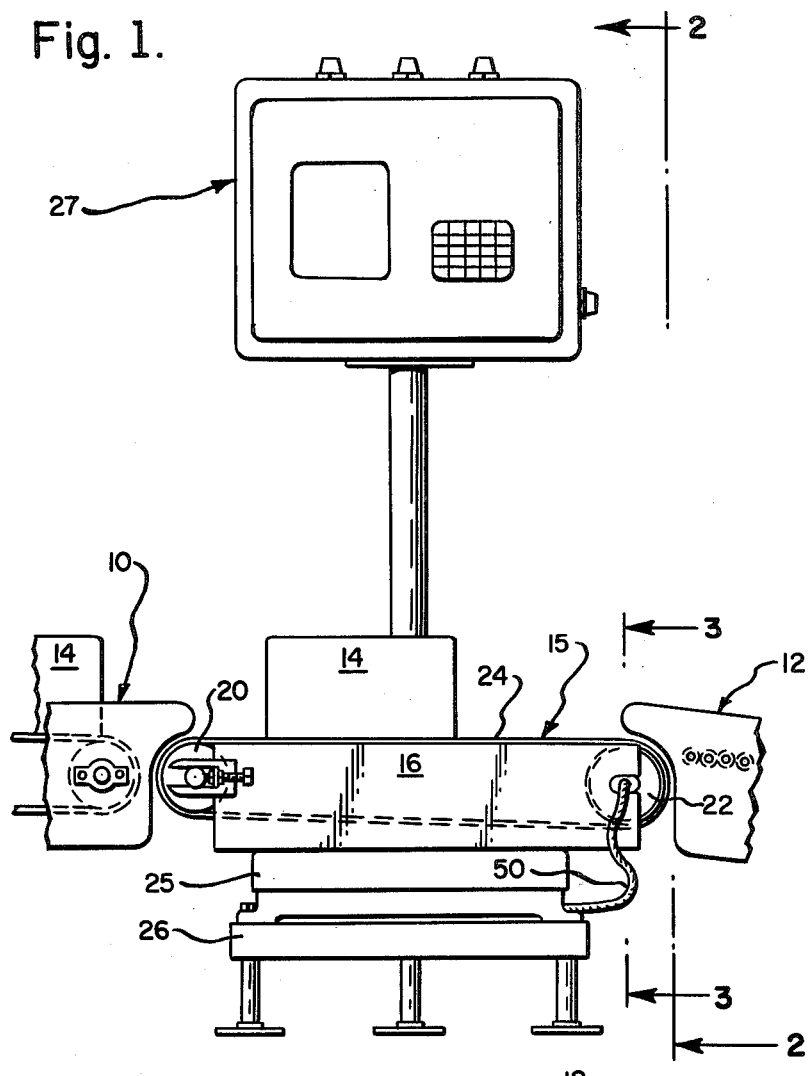
FIG. 1 is a front elevational view of a package weighing/transport mechanism embodying the present invention.

The drawing herewith illustrates a typical embodiment of the invention in connection with a delivery conveyor as is generally designated at 10, and a take-off conveyor such as is generally indicated at 12. Thus, the system transports packages such as is shown at 14 across a weighing unit as is designated generally at 15, from the delivery conveyor 10 to the take-away conveyor 12.

It is of course to be understood that the delivery and take-off conveyors may be of any suitably preferred types, and comprise per se no part of the present invention.

Figure 2:
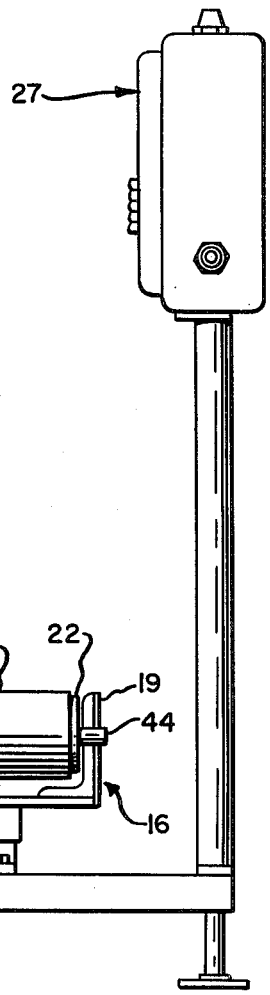
FIG. 2 is a side elevational view taken as along line 2—2 of the mechanism of FIG. 1.
Figure 3:
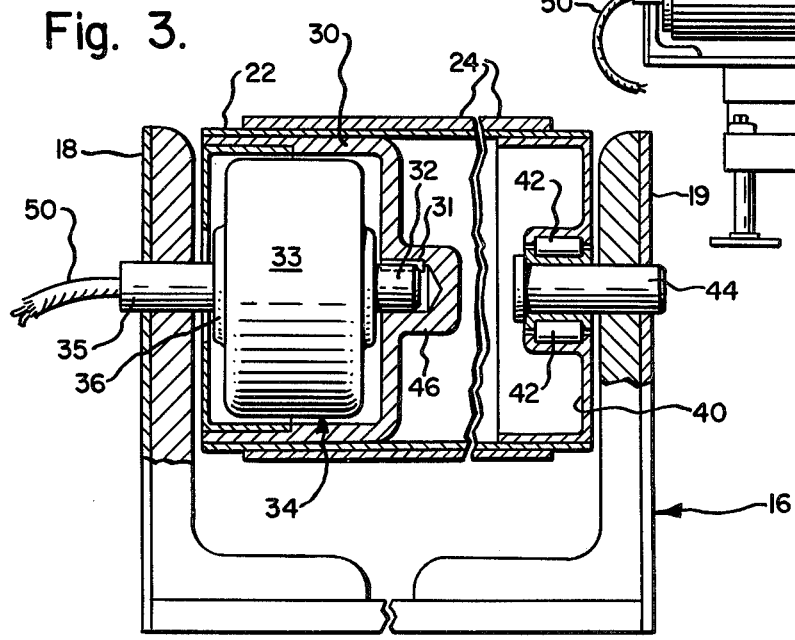
FIG. 3 is a fragmentary enlarged scale view taken partly in section as along line 3—3 of FIG. 1.

The combination weighing/transporting unit of the present invention as shown at 15 is mounted upon a frame structure 16, such as may be of the open top channel-shaped configuration having oppositely upstanding side walls 18,19 as best shown at FIGS. 2 and 3. These side walls support in freely rotational manner at the opposite ends thereof conveyor support rollers such as are shown at 20,22. Thus, the rollers 20,22 carry the endless conveyor belt 24 therebetween; and the unit structure comprising frame 16; rollers 20,22; and conveyor belt 24 is mounted on a weight-sensing device such as is indicated generally at 25. This weighing device may be of any suitable type, and again per se comprises no part of the present invention; and as shown may be carried upon a support base 26 as is typical in the industry. The weight reading/recording facility in association with the weighing device 25 is shown at 27.

As shown in detail at FIG. 3 of the drawing in accord with one preferred form of the invention, the shell 22 of the conveyor driving roller of the unit is closed at one of its ends by an "end bell" 30 which is rigidly affixed thereto. The hub 46 of the end bell 30 is also keyed as shown at 31 to the rotor shaft 32 extending from the rotor 33 of an electric motor such as is designated generally at 34. A support post 35 which extends through the frame side wall 18 and is rigidly affixed thereto carries at its inner end the stator 36 of the motor 34 in stationary position thereon. At its other end, the roller shell 22 is rotatably carried by means of an end bell 40 and bearings 42 upon a stub shaft 44 extending rigidly from the frame side wall 19. Thus, both ends of the drive roller 22 are rotationally supported on the frame and the motor 34 is located concentrically internally thereof; the motor driving rotor 33 being thus disposed in harmoniously balanced relationship with the conveyor drive roller assembly.

By virtue of this arrangement, the weighing operations conducted in conjunction with the conveyor are not encountered from external disturbances such as are typically imposed on a conveyor drive system of the type wherein a stationarily based power supply motor is located externally thereof and its power is transmitted by means of an interconnecting gear/belt/chain device or the like. Examples of such prior art arrangements are shown in U.S. Pat. No. 4,023,668, and in my earlier patents 3,180,475 and 4,114,707. Note that the electrical power supply line 50 to the motor of the unit of the present invention leads from any suitable remotely located base support and enters the assembly through the post 35. The plasticity of the conductor 50 operates effectively to absorb the almost imperceptible vertical floating movements of the unit 15 incidental to passage of successively weighed items over the unit.

I claim:

1. In a commodity weighing conveyor system which includes a support base, a weight-sensing device on said support base, a frame carried by said weight-sensing device and an endless conveyor belt mounted on said frame, the improvement comprising means for substantially eliminating weighing errors incidental to operation of said conveyor belt wherein:

said frame includes upstanding side walls, a first roller journalled between said side walls and a drive roller in spaced parallelism to said first roller, said conveyor belt being trained over said rollers, said drive roller including a cylindrical shell closed at one end by an end bell having a transverse wall spaced from said one end of the shell to define and end pocket therewith, said transverse wall having a centrally disposed hub provided with a bore opening into said pocket and having at least one keyway, an electric motor disposed within said pocket and including a stator and a rotor, said stator having a hollow support post extending axially of said shell and through one of said upstanding side walls and secured thereto whereby to fix said stator to said frame, said rotor having an axially extending drive shaft fixed thereto and projecting into said bore in keyed relation thereto whereby to rotatably drive said end bell directly and in unison with said rotor, and electrical connector means projecting through said hollow support post for energizing said motor.

2. In the system as defined in claim 1 wherein said conveyor belt is trained directly over said rollers so that generally parallel upper and lower conveyor belt flights are defined, and including means for adjusting said first roller relative to said drive roller so as to tension said belt.

* * * * *